Dec. 24, 1940.  W. M. MAGGART  2,226,476
HOG FEEDER
Filed Feb. 5, 1940  3 Sheets-Sheet 1
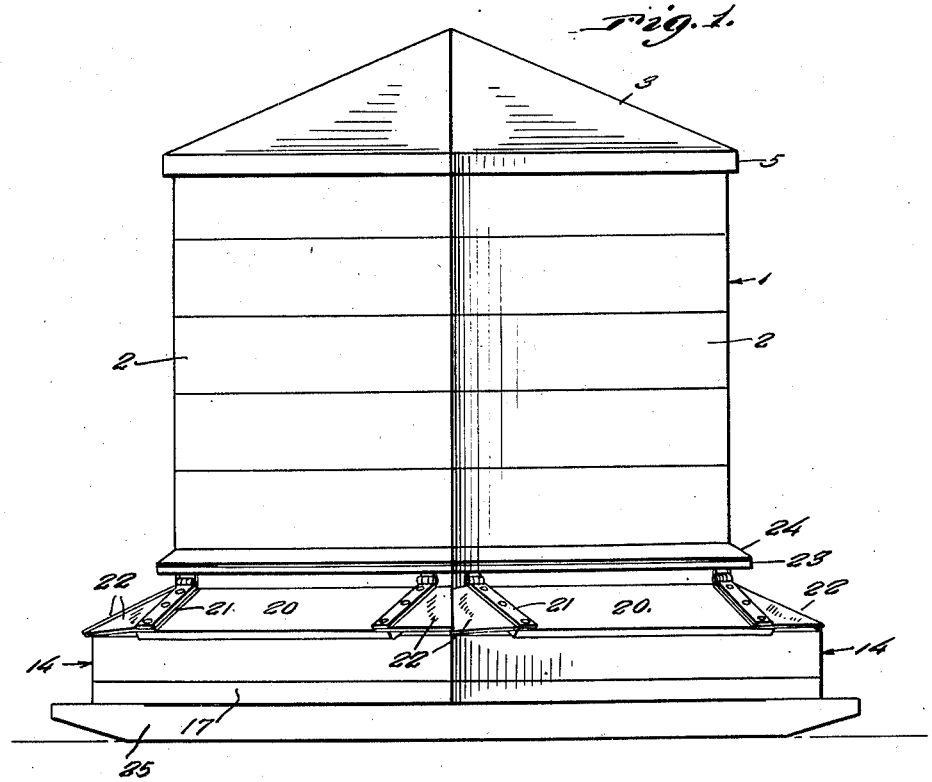
Inventor
Wilmer M. Maggart
By Clarence A. O'Brien
and Hyman Berman
Attorneys

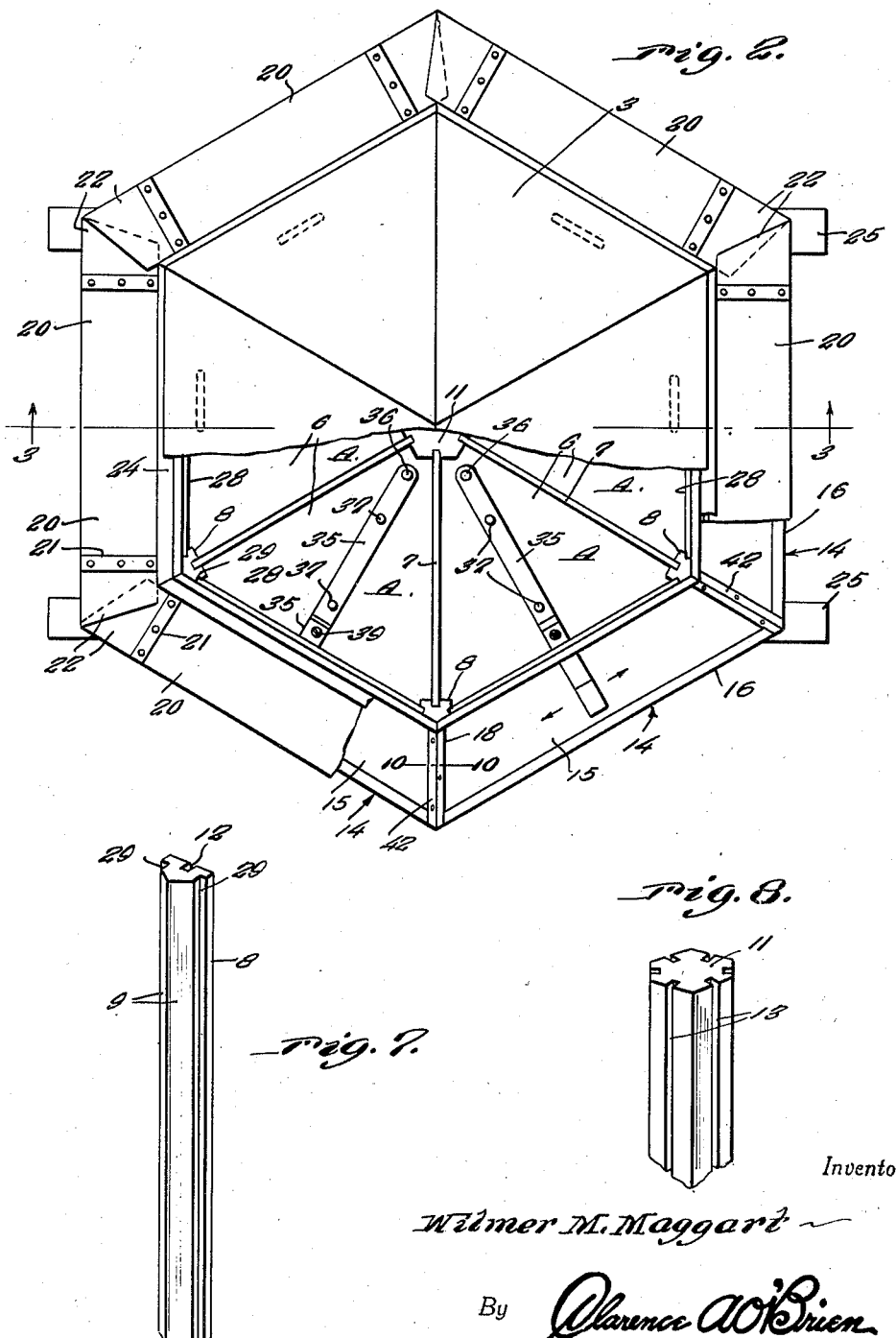

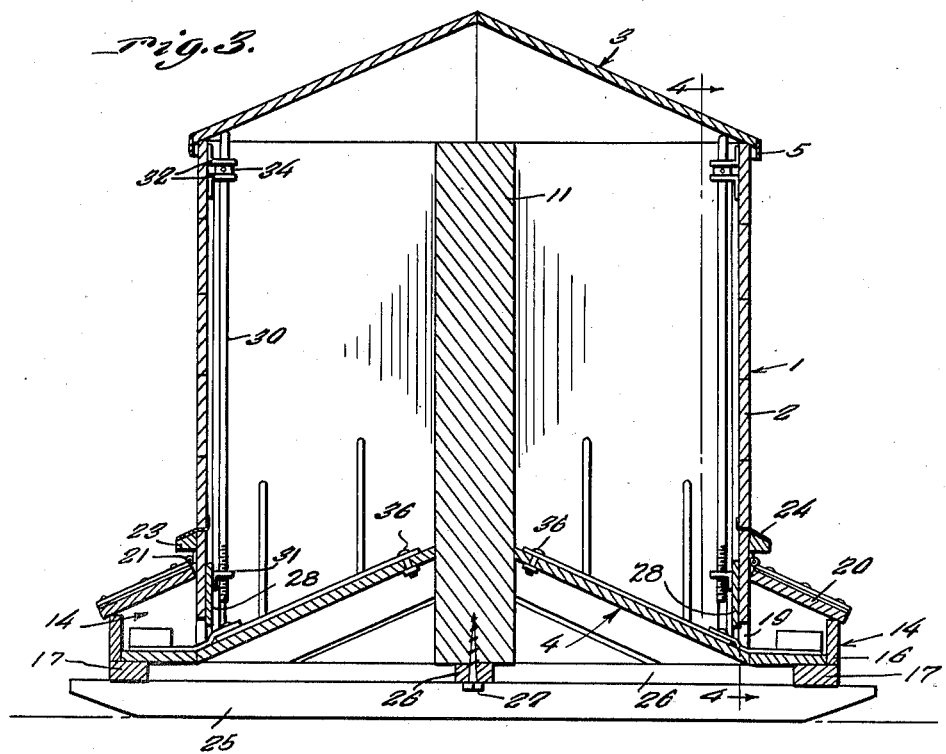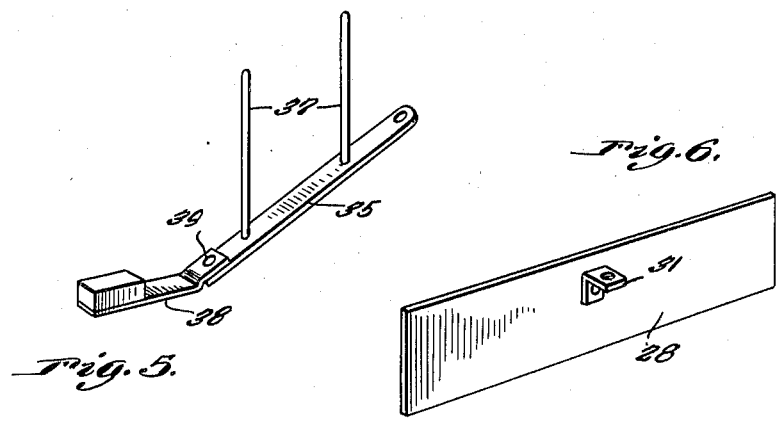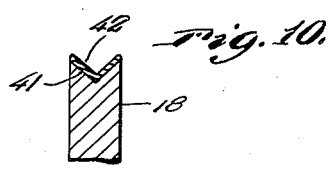

Patented Dec. 24, 1940

2,226,476

UNITED STATES PATENT OFFICE 2,226,476

HOG FEEDER

Wilmer M. Maggart, Arcadia, Ind., assignor of one-half to Charles N. Maggart, Indianapolis, Ind.

Application February 5, 1940, Serial No. 317,399

4 Claims. (Cl. 119—53.5)

My invention relates to improvements in hog feeders of the type providing for feeding a number of hogs different foods.

By way of premise, it is an established fact that hogs, like most other animals, are created with the instinct to, in the wild state, select their food and balance their diet in accordance with their physical requirements and as a result of this inherent characteristic are, when running wild, comparatively free from diseases which cause huge annual loss to hog raisers and jeopardize the health of the pork consuming public. Hog raisers in order to hasten growth and fattening commonly resort to quantity feeding of mixed fattening foods which, although usually combining scientifically balanced rations, frequently do not meet the actual requirements of the hogs, in that they are forced to consume some food ingredients in excess of their actual requirements and are deprived of others in the quantity essential to health.

Having the foregoing in mind, the principal object of my invention is to provide a hog feeder for feeding a variety of different foods, separately, for selection by the hogs as desired.

Another object is to provide a hog feeder for feeding a variety of foods separately and simultaneously to a large number of hogs without necessitating crowding the hogs together to their injury.

Still another object is to provide a hog feeder for the purposes set forth in the foregoing and which is of the gravity feed type and designed to obviate waste.

A further object is to provide a hog feeder of the gravity feed type equipped for agitation of the food by the feeding hogs to accelerate the feeding operation.

Other objects are to provide a hog feeder which is easy to fill with food, weatherproof, durable, and inexpensive to manufacture.

Other and subordinate objects are also comprehended by my invention, all of which, together with the precise nature of my improvements, will be readily understood when the succeeding description and claims are read with reference to the drawings accompanying and forming part of this specification.

In said drawings:

Figure 1 is a view in side elevation of a preferred embodiment of my invention,

Figure 2 is a view in top plan with the roof structure partly broken away to show the interior feed hoppers, Figure 3 is a view in transverse section taken on the line 3—3 of Figure 2, Figure 4 is a fragmentary view in side elevation of one of the side wall panels and feed controlling gates looking at the inner faces thereof, Figure 5 is a view in perspective of one of the feed agitators, Figure 6 is a similar view of one of the feed controlling gates, Figure 7 is a view in perspective of one of the studding posts, Figure 8 is a similar view of the center post, Figure 9 is a fragmentary view in perspective of one of the trough lids, and Figure 10 is a view in transverse section of one of the trough partitions.

Referring now to the drawings by numerals, the illustrated embodiment of my invention comprises a multiple feed hopper unit, designated generally 1, preferably of hexagonal form in cross section and including side wall panels 2 disposed edge to edge, a roof structure 3 of pyramid form and hexagonal edge contour surmounting said panels 2, and a bottom unit 4 also of pyramid form and hexagonal edge contour slanting upwardly into the space defined by the panels 2 and from which said panels arise with the lower ends fitting flush with the edge of said bottom unit. The roof structure 3 is fitted on the upper ends of the panels 2 with its edge parallel with the sides of said panels and is removable therefrom for access to the interior of the hopper unit. A strip 5 of any suitable material is secured by nails, not shown, to the edge of the roof structure 3 to depend therefrom alongside the panels 2 and prevent rain from beating into the interior of the hopper unit.

The bottom unit 4, as best shown in Figure 2, is constructed to provide six hopper bottoms, designated 6, of substantially triangular form and inclining downwardly to the lower edges of the panels 2, respectively, with the sides thereof diverging from a common center point to the sides of said panels 2.

A plurality of vertical partitions 7, of the same number as said bottoms 6, are provided in the space defined by the panels 2, said partitions 7 upstanding from the bottom unit 4 at the juncture of the bottoms 6, respectively, said partitions 7 and bottoms 6 forming the side walls and floor of transversely triangular hoppers A, each closed, with the exception presently noted, by a side wall panel 2 at the front thereof.

Upstanding from the bottom unit 4 at the abutting edges of the panels 2 is a plurality of studding posts 8 having bevelled front sides 9 for fitting flush against said panels 2 and to which the latter are suitably secured as by nails, not shown. Extending upwardly through a suitable central aperture 10 in the bottom unit 4 is a center post 11 of hexagonal form in cross section. Posts 8 and 10, as will be understood, terminate in line with the upper ends of panels 2. The rear faces of the studding posts 8 are grooved vertically and centrally, as at 12, and the side faces of the center post 11 are similarly grooved, as at 13, to slidably receive the partitions 7, whereby the latter may be removed vertically for cleaning when desired.

In front of the base of each panel 2, which is to say in front of the bottom of each hopper A, is a flat-bottomed, straight front feed trough 14, the bottom 15 of which forms a horizontal extension of the bottom 6 of the hopper. The bottom 15 and front 16 of each trough 14 are supported, at the front of the trough, by an underlying beam 17 extending along said front. The troughs 14 are arranged in end-to-end adjoining relation and are separated in the planes of the partitions 7 by end partitions 18 therein. Each hopper A communicates with its trough 14 by way of a feed slot 19 extending along the bottom end of the panel 2 forming the front of the hopper, whereby feed stored in the hopper may flow under the influence of gravity into the trough. Each trough 14 is adapted to be closed by a suitable cover, or lid, panel 20, slanting, when closed down, from the appropriate panel 2 and hinged at its rear edge to said panel by strap hinges 21. As best shown in Figure 2, the cover, or lid, panels 20 close in end-to-end adjoining relation with a clearance space therebetween, so that they may be opened without overlapping and thus interfering. To form a weather-tight seal between said panels 20, when closed, a pair of flaps 22 of flexible waterproof material, such as rubber ducking, are suitably secured to adjoining ends of panels 20 to overlap when said panels are closed. To prevent water from seeping into the troughs 14 between the panels 2 and cover, or lid, panels 20, a sectional continuous water shed strip 23 is secured around the panels 2 at a suitable distance above the cover panels 20, said strip having a suitable bevelled top, and a sheet metal flashing strip 24 extended through the panels 2 over the top of said strip 23 with its inner edge bent up against the inner faces of panels 2 and suitably secured to the same. The flashing strip 24 may also be suitably secured to the strip 23. The cover, or lid, panels 20 overhang the fronts 16 of the troughs 14 to shed water therefrom.

The structure so far described is supported by a pair of parallel skids or runner bars 25 arranged upon opposite sides of the structure and underlying beams 17 at opposite sides of the structure.

A horizontal spider frame, of cross bars 26, extends between the beams 17, as represented in Figure 3, above the bars 25, said bars 26 partly supporting the bottoms 15 of troughs 14 also as represented in Figure 3. The beforementioned center post 11 has its lower end secured to the center of the described spider frame by a screw 27.

For each hopper A there is provided a gate 28 of elongated rectangular form for varying the size of the slot 19 to control the flow of feed from the hopper into the trough 14 of the hopper, said gate being slidably mounted at its ends in the rear of said slot for vertical adjustment in longitudinal guide grooves 29 provided in the studding posts 8 to which the partitions 7 of the hopper are slidably connected as previously described.

Means are provided for adjusting each gate 28 in the form of a crank rod 30 extending upwardly from the longitudinal center of the gate in the rear of the appropriate panel 2 with its lower end threaded into a right angled metal bracket 31 suitably fixed to the back of the gate, and its upper end portion journalled in a pair of vertically spaced right-angled metal brackets 32 suitably fixed to the back of the panel 2. The crank rod 30 terminates at its upper end in a crank 33 adjacent the top of the panel 2 whereby the rod may be rotated to lower or lift the gate and vary the size of the feed slot 19. A collar 34 fixed to the rod 30 intermediate the pair of brackets 32 coacts with said brackets to prevent vertical movement of the rod.

Each hopper A is equipped with an agitator for operation by the snout of a hog while feeding to loosen up feed in the hopper and facilitate flow thereof into the trough of the hopper. For this purpose a flat, preferably metallic bar 35 is provided on the bottom 6 of the hopper to extend centrally along the same from the rear end of the bottom to approximately the feed slot 19 of the hopper, said bar having its rear end pivoted, as at 36, to said bottom so that the bar is swingable edgewise, laterally on the bottom of the hopper. A pair of agitator rods of metal, designated 37, are secured to the bar 35 by welding, not shown, in upstanding position, said rods being disposed adjacent opposite ends of the bar. A strip 38 of rubber belting, or other flexible strong material, is secured at one end, as at 39, to the front end of the bar 35 to extend forwardly therefrom through the hopper feed slot 19 into the trough 14 of the hopper and lie flat on the bottom of the latter. A block 40, preferably of wood, is fixed to the strip 38 on top of the same, in any desired manner, for engagement by the snout of a feeding hog to swing the bar 35 laterally.

If desired, the top edges of the partitions 18 separating the troughs 14 may be grooved longitudinally, as at 41, to provide drain gutters for moisture and lined with sheet metal as at 42.

The entire described feeder, with the exception of the hinges 21, brackets 21, 34, rods 30, collars 34, and other parts specified as metal or flexible material, is preferably formed of wood, although metal may be used if desired.

As will now be apparent, the hoppers A are designed to be filled with different foods, by removing the roof structure 3 and for gravity feed of the foods out of the hoppers into the troughs 14 by way of the feed slots 19 under control of the gates 28. As the hogs feed from the troughs 14 the agitator bars 35 are moved from side to side by the snouts of the hogs and the feed in the hoppers A loosened up by said bars and the rods 37 so as to flow freely out of the same into said troughs. As will be clear, by thus agitating the feed the entire contents of the hoppers A will issue therefrom. Obviously, one or more, or all of the troughs 14 may be opened for feeding, as desired, so that a forced selection of feed may be predetermined or selection by the hogs may be provided for.

The foregoing will, it is believed, suffice to impart a clear understanding of my invention without further explanation.

Manifestly the invention, as described, is susceptible of modification without departing from the inventive concept and right is herein reserved to such modifications as fall within the scope of the subjoined claims.

Having described the invention what is claimed as new is:

1. In a hog feeder, a hopper assembly comprising a plurality of transversely triangular gravity feed hoppers for different foods, respectively, arranged about a common center and forming a polygonal unit, each of said hoppers having a vertical front panel provided with a feed discharge aperture in the base thereof, a plurality of feed troughs extending lengthwise across the base of said panels, respectively, to receive food discharged from said apertures, agitators in said hoppers operative to loosen the food therein, and means to operate said agitators comprising swingable members in said troughs, respectively, operative by the snouts of hogs feeding in said troughs and operatively connected to said agitators respectively, said agitators comprising bars pivoted in the bottoms of said hoppers for lateral swinging movement, and upright agitator rods on said bars, said operating means comprising semi-rigid strap members extending from said bars out of said apertures and into said troughs, and lying on the bottoms of the latter, and blocks secured to said strap members within the troughs.

2. In a hog feeder, a bottom structure of polygonal edge contour comprising adjoining triangular floor panels slanting outwardly and downwardly from a common center, and having outer straight edges, adjoining side panels arising from said edges of the floor panels, respectively, flush with said edges and having transverse discharge apertures therein at the bases thereof, posts arising from said floor panels at the junctures of said side panels and to which said side panels are secured, a center post arising from said structure in said common center, vertical partitions arising from said floor panels at the junctures thereof and radiating from said center to said first mentioned posts, said partitions being vertically slidable at opposite edges in said first mentioned posts and said center posts, respectively, for removal at will and forming together with said floor and side panels a plurality of transversely triangular gravity feed hoppers for different foods to be discharged out of said apertures, a removable crowned top unit surmounting said hoppers, and separate feed troughs for said hoppers, respectively, extending lengthwise along the same below said apertures, respectively, and provided with closure lids respectively.

3. In a hog feeder, a bottom structure of polygonal edge contour comprising adjoining triangular floor panels slanting outwardly and downwardly from a common center, and having outer straight edges, adjoining side panels arising from said edges of the floor panels, respectively, flush with said edges and having transverse discharge apertures therein at the bases thereof, posts arising from said floor panels at the junctures of said side panels and to which said side panels are secured, a center post arising from said structure in said common center, vertical partitions arising from said floor panels at the junctures thereof and radiating from said center to said first mentioned posts, said partitions being vertically slidable at opposite edges in said first mentioned posts and said center posts, respectively, for removal at will and forming together with said floor and side panels a plurality of transversely triangular gravity feed hoppers for different foods to be discharged out of said apertures, a removable crowned top unit surmounting said hoppers, separate feed troughs for said hoppers, respectively, extending lengthwise along the same below said apertures, respectively, and provided with closure lids respectively, gates in said hoppers, respectively, slidably mounted in said first mentioned posts for varying the size of said discharge apertures to control the discharge therethrough, and means to adjust said gates from the tops of said hoppers.

4. In a hog feeder, a hopper assembly comprising a plurality of gravity feed hoppers for different foods, respectively, arranged about a common center and forming a polygonal unit, each of said hoppers having a vertical front panel provided with a feed discharge aperture in the base thereof, a plurality of feed troughs extending lengthwise across the base of said panels, respectively, to receive food discharged from said apertures, agitators in said hoppers operative to loosen the food therein, and means to operate said agitators comprising swingable members in said troughs, respectively, operative by the snouts of hogs feeding in said troughs and operatively connected to said agitators, respectively, said agitators comprising bars pivoted in the bottoms of said hoppers for lateral swinging movement, and upright agitator rods on said bars, said operating means comprising semi-rigid strap members extending from said bars out of said apertures and into said troughs, and lying on the bottoms of the latter, and blocks secured to said strap members within the troughs.

WILMER M. MAGGART.